Aug. 22, 1933.    P. MOSIMANN    1,924,049
AEROPLANE
Filed Feb. 27, 1932
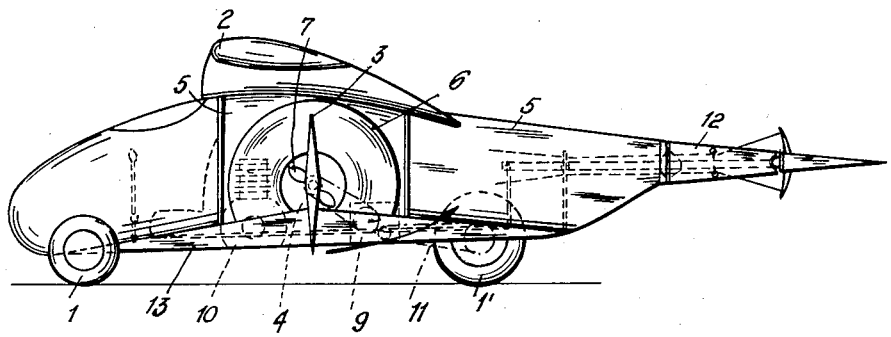
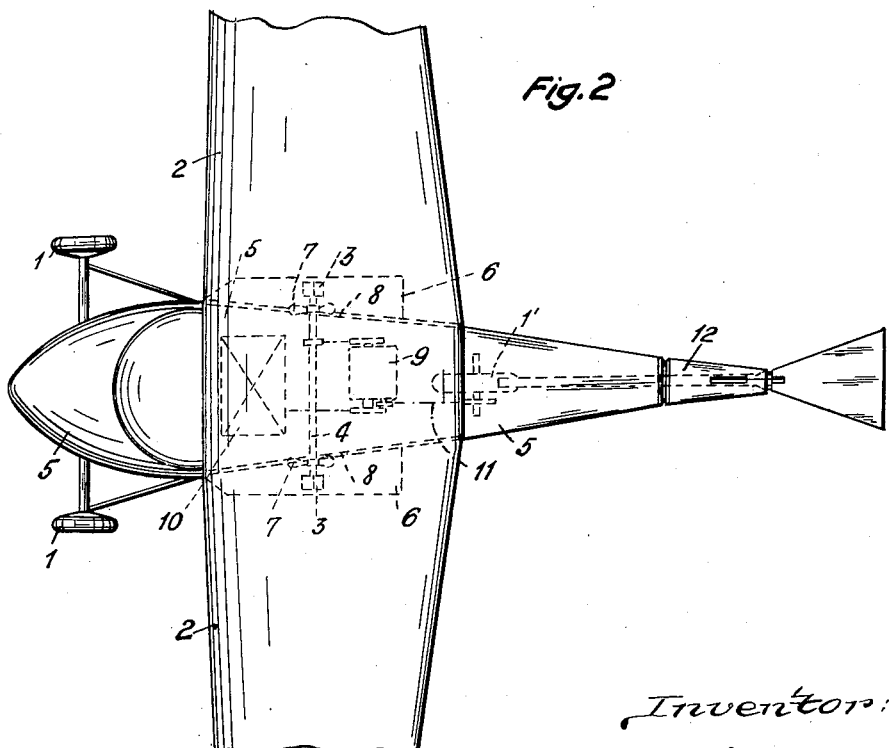
Inventor:
Paul Mosimann
By:
Atty.

Patented Aug. 22, 1933

1,924,049

UNITED STATES PATENT OFFICE 1,924,049

AEROPLANE

Paul Mosimann, Utzenstorf, Switzerland

Application February 27, 1932, Serial No. 595,632, and in Switzerland February 9, 1932

1 Claim. (Cl. 244—16)

The known aeroplanes are open to the objection that they are relatively heavy, the power is not utilized to its full effect, and the costs of production and running are relatively high. Moreover, they do not give complete satisfaction as regards safety in service. The starting and landing capabilities require large spaces of ground and the steering and operation is also dependent to a too great extent upon the skill of the pilot.

This invention relates to an aeroplane which in principle and drive differs considerably from the known constructions and is suitable as a single man, sport, passenger, large, hydro-plane or aeroplane. The invention consists in that propellers are arranged longitudinally to the direction of flight of the aircraft under the supporting plane on both sides of the fuselage, which propellers rotate in the direction of flight. The whole is so constructed that the propellers exert their entire action when rotating directly under the fuselage and the supporting planes and the air is beaten in downward direction and chiefly towards the rear by the propeller blows and consequently a forward and upward impulse is imparted to the aircraft.

An embodiment of the invention is illustrated by way of example in the accompanying drawing in which:—

Fig. 1 shows the aircraft in side elevation.

Fig. 2 is a top plan view of Fig. 1.

The air craft illustrated is a monoplane, which is mounted on wheels 1, whereas two propeller blades 3 keyed on a common axle 4 are provided one on each side under the planes 2. The propeller blades 3 rotate each in a casing arranged on the fuselage 5, only about two thirds of the propeller being accommodated in the casing, so that the propellers project from their casings in downward direction. Small propellers 7 exerting a suction effect are keyed on the propeller axle 4. These small propellers 7 each rotate in an aperture 8 in the fuselage, which apertures establish communication between the engine space and the outer air. The propeller axle 4 is driven from an engine 10 through the intermediary of a gearing 9. A driving mechanism 11 for the rear wheel 1' is actuated from the gearing 9 for propelling the aircraft along the ground. By thus transmitting the engine power to the rear wheel 1', in a similar manner to the drive of a motor cycle and with the aid of the propeller blades, the start only requires a very short run. Moreover, the landing can easily be effected with the aid of the propeller blades by reversing same. The cooling of the engine is effected in a reliable manner by the small propellers 7, the air being drawn by them through the apertures 8 into the engine space. In the fuselage itself a suitable air admission aperture must also be provided in front of the engine, which aperture is not shown and may be situated either above or below the engine. The cooling air drawn in by the small propellers 7 is conveyed to the centre of the propeller blades 3 and assists the upward and forward drive.

The tail 12 for the aeroplane according to the invention is preferably shiftable in the horizontal plane. The fuselage serves as carrier for the pilot, the driving mechanism for the motor and the stays for supporting the planes, the carriage, the steering gear and the supporting element for the tail portion. The fuselage has on each side of its underside two H-girders of dur-aluminium or steel which are directly connected proof against torsion at the front and rear by bends or at intermediate points by suitable stays. The supports for the plane connections can be constructed and fitted in known manner. The fuselage is preferably made in stream line shape by ordinary rib construction. The propeller blades 3 are so shaped that, when they are rotating, the air is not drawn directly through same, as is the case in the known aeroplanes with transverse arrangement of the propellers, but is whipped in longitudinal direction from the front towards the rear, namely in the stream line of rotation. A portion of the air gripped by the propeller blades is forced upwards on to the undersides of the supporting planes in order to effect the lifting moment, whereby an exceptionally good rising capability is produced. The larger quantity of air displaced towards the rear acts as forward driving moment, as indicated by the arrow A in Fig. 1 so that the aircraft moves in the longitudinal direction of the propeller blades extending parallel the one to the other. It is evident that the wheels might be mounted directly on the fuselage and adapted to be pushed in and pulled out.

The aircraft is preferably provided with a tail movable in the horizontal plane, the controlling methods forming the subject matter of a separate patent application and being therein described in detail.

The aircraft described can be constructed very light, simple and compact. The utilization of power is very good, the costs of production and running are very low, and very safe flying is ensured. The aeroplane is further capable of starting and landing in a small space. The simple aeroplane mechanism ensures a reliable steering and the operation is no longer dependent on the skill and attention of the pilot. Moreover, the danger for men working near the aircraft at the start is reduced to a minimum.

I claim:—

An aeroplane, comprising in combination with the fuselage having an aperture in each side and the supporting planes, two propellers arranged under the supporting planes one on each side of the fuselage adapted to rotate in the direction of travel, to exert their effect when rotating directly under the fuselage and the supporting planes and to whip the air downwards and chiefly towards the rear, thus imparting a forward and upward impulse to the aeroplane, a common axle extending transversely through the apertures in said fuselage and carrying one of said propellers at each end, a casing on each side of said fuselage partly surrounding the corresponding propeller and allowing said propeller to project at the underside, and two small propellers mounted on said axle one in each aperture in said fuselage adapted to throw air against said propellers to effect the circulation of the cooling air for the engine and at the same time to increase the air pressure within the range of said propellers.

PAUL MOSIMANN.